CODED INK RECORDING AND READING

Original Filed Feb. 9, 1966 2 Sheets-Sheet 1

INVENTOR.
LESTER AARON SIEGEL
BY
Samuel Branch Walker
ATTORNEY

CODED INK RECORDING AND READING

Original Filed Feb. 9, 1966 2 Sheets-Sheet 2

INVENTOR.
LESTER AARON SIEGEL
BY
Samuel Branch Walker
ATTORNEY

United States Patent Office

Re. 27,770
Reissued Oct. 2, 1973

27,770

CODED INK RECORDING AND READING

Lester Aaron Siegel, Stamford, Conn., assignor to American Cyanamid Company, Stamford, Conn.

Original No. 3,486,006, dated Dec. 23, 1969, Ser. No. 526,193, Feb. 9, 1966. Application for reissue Dec. 9, 1971, Ser. No. 206,569
Int. Cl. G06k *1/12, 7/12*
U.S. Cl. 235—61.11 E 6 Claims

Matter enclosed in heavy brackets [ ] appears in the original patent but forms no part of this reissue specification; matter printed in italics indicates the additions made by reissue.

ABSTRACT OF THE DISCLOSURE

A typewriter or similar machine is provided with a ribbon having horizontal zones each zone having an ink containing a single photoluminescent or other color selective component of a code which is different from that of every other horizontal zone in the ribbon. Code hammers, either arranged on a type bar or a single head with controllable hammers, strike through the particular ribbon zones corresponding to the code for the letter or other symbol on the typewriter keyboard. This results in printing a series of small, vertically spaced marks corresponding to the code. If desired an additional zone of the ribbon may have ordinary ink and a type bar may also have a shaped symbol that strikes this zone. Readout is by simultaneous illumination of all of the code marks by ultraviolet light or if there are some code marks which are visible colors by successive illumination with ultraviolet light and then with visible light. As the whole of the code marking area is illuminated at the same time the problem of misalignment in readout is eliminated.

SUMMARY OF THE INVENTION

This application is concerned with a method of coding characters or symbols by means of a number of photoluminescent materials, including preferably chelates of lanthanide ions. The symbols or characters involve different mixtures of one or more of the photoluminescent components. The number of different symbols is $2^n-1$ when n is the number of photoluminescent components, for example 15 with 4 components, 63 with 6 components, and the like. Each symbol has the mixture of the various components corresponding to the symbol all present at the same time, and the symbol is read by illumination with ultraviolet light, for example a mercury vapor lamp, and allowing the fluorescence produced to strike a number of detectors equal to the number of photoluminescent components, each one responding only to the wavelength range of the fluorescence of a single component. The chelates of the lanthanide ions fluoresce in very narrow wavelength bands due to excitation of the lanthanide atoms to a particular metastable state, the emission being when the atom returns to a lower state. Ordinary fluorescent materials operate under a slightly different mechanism and have much broader bands of fluorescence. This is why the chelated lanthanide ions are preferred as at least part, and if desired all, of the photoluminescent components. In general the fluorescence band of ordinary fluorescent material, such as for example 4.5 diphenylimidazolone-2, is broad enough so that generally it is practical to use only one ordinary fluorescer as a component in the coded symbol.

Some problems have arisen in printing the symbols on a typewriter or analogous machine because of contamination of the mixture for one symbol with small amounts of other mixtures which have been printed before and which correspond to different symbols. It is with an improved printing apparatus that the present invention deals. The typewriter or analogous printing machine is provided with a ribbon divided into zones at right angles to the line of printed symbols for a given message. In a common type of machine, analogous to an ordinary typewriter, the message is usually in a horizontal line and so the ribbon is divided into horizontal strips or zones. For simplicity, in the remainder of the specification reference will be made to horizontal zones, although it should be realized that it is of course possible to design printing machines in which the message is vertical, for example on a tape, and in such a case the directions are turned through 90°, horizontal becomes vertical and vice versa. Because of the more common type of machine with horizontal message lines, this simplified terminology will be used to illustrate the invention.

Let us assume a symbol code with six photoluminescent components with five of them chelates of different lanthanide ions and the sixth either a chelate of a different ion or an ordinary fluorescing material, such as for example the diphenylimidazolone referred to above. Each horizontal zone or strip in the ribbon is impregnated with one component only and a typing bar having a vertical height of the total number of ribbon strips with projections aligning with the particular ones for each coded symbol is used. When the key corresponding to the symbol, for example letters of the alphabet, number digits, mathematical signs and the like, is struck, the corresponding type bar prints through the ribbon, for example a number of rectangles, corresponding to the components in the coded ink. An alternative method is to have a vertical printing head with six hammers which can be caused to project and strike the ribbon to type the particular coded symbol or can be caused to project from the vertical head, which then is caused to strike the ribbon. Let us assume, for the sake of illustration, that a type bar with projections aligning with the second and fourth strips on the ribbon is actuated and prints two tiny rectangles, one in the component corresponding to the second strip and one in the component corresponding to the fourth strip. For example, these strips might be impregnated with europium chelates and terbium chelates respectively.

It is important that the strips do not permit contamination of one strip with components from another one. This usually requires a slight separation between the strips and preferably a carbon type of ribbon is used in which the coating is solid and not liquid, as impregnated ink in a fabric is, and which ribbon is used only once through. This is the preferred form of ribbon but of course any other form which will permit separation of the strips, each having one of the symbol components, can be employed.

Readout is effected by illumination with ultraviolet light and spectral analysis or resolution of the particular bands of fluorescence occurring. The physical separation of the different components in the present invention may require some modification of the optical portion of the readout when certain methods are employed. This will be set out in more detail below. In any case, the present invention presents certain important advantages. One of the principal advantages is that a given type bar or the portions thereof always make an impression of a single component of the coded ink. There is no possibility of contamination because a key may have struck another component or mixture for a preceding symbol and still retain some residual amounts of this component or components.

The complete separation of each component increases the reliability and sharpness of resolution of the message. If we consider any uncertainty as the analog of noise in an electrical system we may think of the present invention as having the advantage of printing symbols which in reading out show a higher signal to noise ratio, always a desirable characteristic of any system. Ambiguities are thus minimized or completely eliminated and control of the whole system is rendered less critical. One illustration of this advantage will suffice. When there is contamination of components in a symbol, it may be possible to read out satisfactorily if the radiation intensity of the ultraviolet light is very high and the efficiency of detection and signal processing also high. If the reliability or signal to noise ratio is only moderately adequate, reductions in illuminating power, efficiency of detection of the fluorescent responses and the like may drop below the level at which precise, unambiguous resolution results. In the case of the present invention, however, where there is never any contamination, the same loss of illumination intensity or other factors affecting final response might still be completely adequate. It must be remembered that coded ink message symbols may be used under a wide number of operating conditions, some of them, for example reading numbers or messages on passing box cars, rapidly moving checks and the like, represent conditions which are not always as ideal as those which can be maintained in the laboratory; and therefore additional margin of safety for adequate reliability, which the present invention provides, is always a practical and useful advantage.

A printed symbol may have both a definite shape that can be recognized by visual observation and the coded inks in the single symbol. For example, in the case of numerical and letter messages, there can be added a black pigment, and the symbol then appears visually in its shape. For example, the digit 2 would look like a black 2 and would also have the combination of components which would correspond to the same symbol. In some cases the ability to read a message without ultraviolet or other illumination and spectral analysis is of practical importance. Of course in such a case the secrecy of the message is comprised, which would otherwise be assured by printing only an arbitrary shape and relying on the fluorescence of the coded ink only. The present invention lends itself to the modification permitting reading without irradiation, for example by typing the particular symbol above or below the other symbol strips in, for example, a black ribbon zone. In such a case striking the keyboard of the modified typewriter or printer for a particular symbol, for example again the member 2, would cause the proper hammers to protrude in the coding key and also a second type key with 2 on its face will strike above or below the coding key. By suitably offsetting these other ordinary typing keys, the coding key and the ordinary key may be struck at the same time.

DESCRIPTION OF THE PREFERRED EMBODIMENTS

Figure 1:
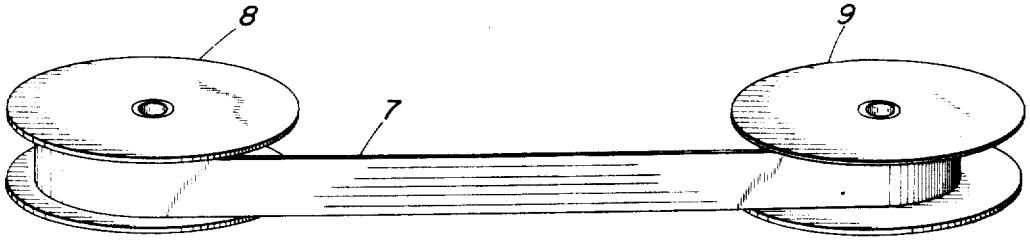
FIG. 1 is an elevation in semi-diagrammatic form of a type or printing ribbon.
Figure 2:
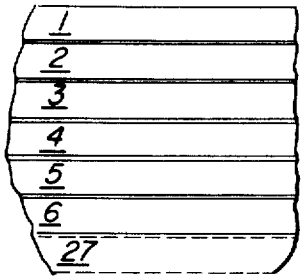
FIG. 2 is an enlarged representation of a portion of the ribbon with the zones more clearly separated.

In FIG. 1 a typing or printing ribbon is shown generally at 7 with the conventional spools 8 and 9. The ribbon, as can be best seen in FIG. 2, which is an enlarged view of a portion of the ribbon, is divided into six horizontal strips numbered 1 to 6. Each strip is impregnated or coated with a composition containing at least one photoluminescent component. For example, strip 1 may have a compound containing 4,5-diphenylimidazolone-2, and strips 2 to 6 carry chelates of various lanthanide ions.

Figure 3:
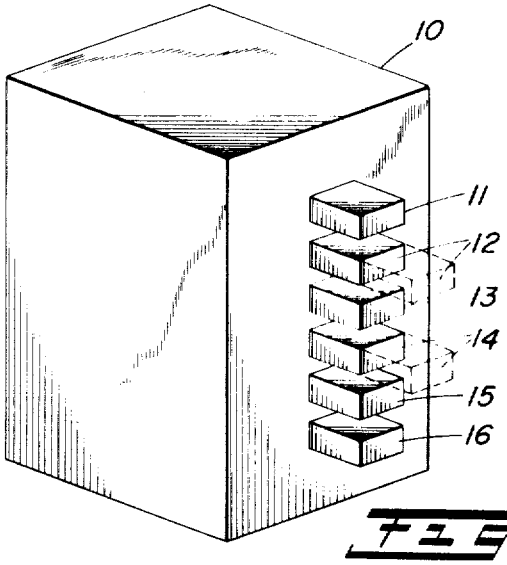
FIG. 3 is an elevation of a coding printing head with six hammers.

FIG. 3 shows in diagrammatic form a printing head 10 with six hammers 11 to 16 positioned to align with the ribbon strips 1 to 6 respectively and which are individually actuated by pressing different coding keys.

Figure 4:
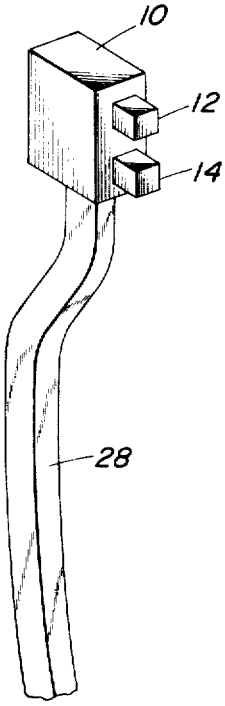
FIG. 4 is an elevation of a type bar with the arm of the bar broken away.

FIG. 4 shows an ordinary type bar with an arm 28 and a type face which performs the same function as the printing head and is therefore also numbered 10. On the type bar there are projections 12 and 14 which correspond in alignment to the two hammers 12 and 14 in FIG. 3, which in that figure are shown as having been actuated by a particular symbol. When the type bar strikes the ribbon it prints one or more rectangles of the particular photoluminescent materials, in the case of FIG. 4 those from strips 2 and 4.

Figure 5:
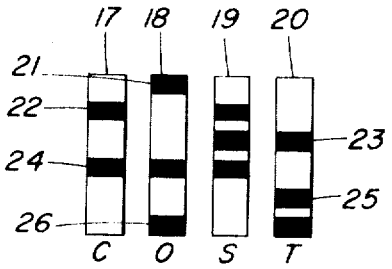
FIG. 5 is the representation of four symbols in the form of vertical strips.

FIG. 5 shows a series of strips 17 to 20 for the first four symbols of the message. The rectangles are numbered 21 to 26 respectively in the same order, vertically, as the strips 1 to 6 of the ribbon and the hammers or projections 11 to 16.

In FIGS. 3 to 5, the size of the hammers or projections and the rectangles is enormously exaggerated for the sake of clarity. In an actual machine the rectangles are quite tiny, for example having heights of less than 1/16", and of course the actual areas printed may be of any desired shape, such as dots, as it is an advantage of the present invention that the particular shape of symbols is immaterial.

Reference has been made above to the possibility of combining the photoluminescent or light-determined symbols with an ordinary colored symbol on the face of the type bar 10. Assuming that the four symbols of FIG. 5 stand for the four letters C, O, S, T respectively, these letters can be printed by a separate portion of a bar below the luminescent symbols and this is shown also in FIG. 5. As the actuation of these ordinary type keys is conventional, they have not been shown in FIGS. 3 and 4. The ordinary type keys require an additional strip on the ribbon, which is shown in dashed lines at 27 on FIG. 2.

Figure 6:
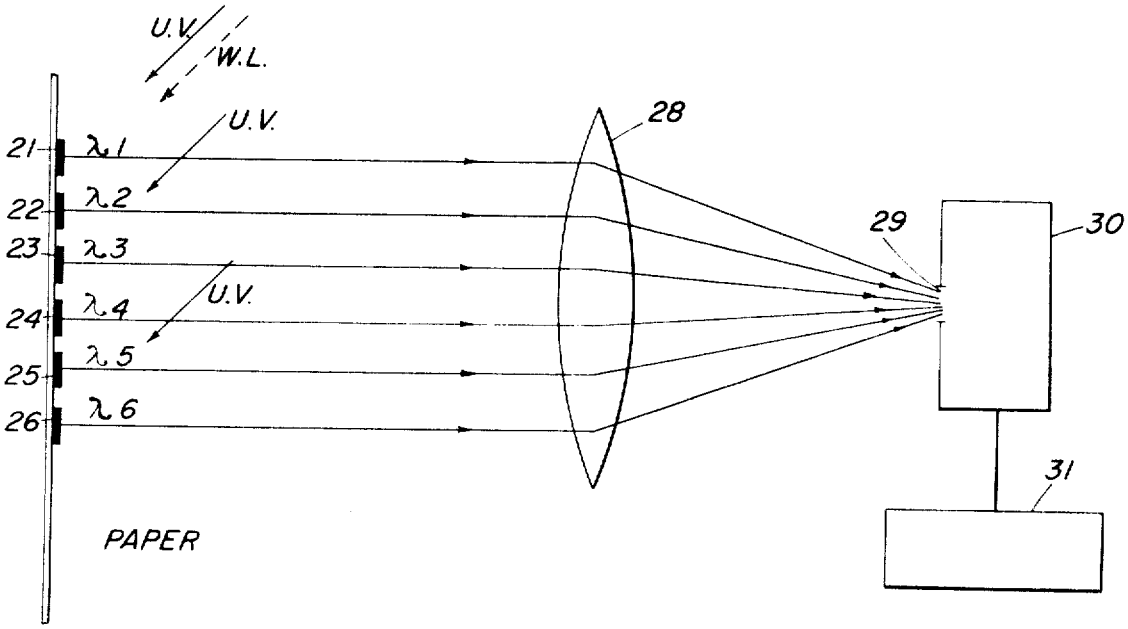
FIG. 6 is a diagrammatic representation of a readout mechanism for all photoluminescent symbols.

FIG. 6 illustrates the readout and to illustrate this a symbol with rectangles in each of the strips, i.e., with rectangles 21 to 26, is shown. The symbol is irradiated with ultraviolet light, which is shown diagrammatically by the similarly labelled arrows in FIG. 6. This causes the different rectangles 21 to 26 to fluoresce at their particular wavelengths or more accurately narrow wavelength bands. This is indicated on FIG. 6 by $\lambda_1$ to $\lambda_6$. As is often done, the wavelength symbol is used for a restricted range of wavelengths, for of course absolute fluorescent monochromaticity is an unrealizable ideal. The six fluorescent beams are focused preferably by a cylindrical lens 28, on the slit 29 of a spectrum analyzer 30, the output of which appears on conventional readout means 31. As the design of the spectrum analyzer 30 and readout 31 are completely conventional and are not changed by the present invention, they are shown only diagrammatically as blocks. It may be mentioned that the spectrum analyzer may be of various types, such as an array of detectors with sharp cutting interference filters, a prism, or other dispersing means which separates the different wavelengths geometrically and the like. The readout means may print the symbols, represent them on a long persistent phosphor oscilloscope or any other type.

I claim:

1. A system of coded ink printing with photoluminescent coding components including an apparatus having a keyboard, a ribbon with a plurality of strips each strip carrying an ink having a single code component and being incapable of mixing with the ink on adjacent strips, type keys including vertically separated printing elements oriented to strike the ribbon strips corresponding to a code for the particular type key whereby discrete areas are in separate coding components without mixing of more than one component in a discrete area.

2. A system according to claim 1 in which the ribbon is provided with at least one strip having an ink in a visible color.

3. A system according to claim 1 including means for readout comprising means for illuminating with ultraviolet light the whole of the marking area having the code marks at a single time and means for selectively detecting the different photoluminescent wavelength bands and reading out therefrom the symbol.

*4. A system according to claim 2 in which the ribbon has one strip with a photoluminescent code component and one strip with an ink of a visible color, and said type key has printing elements adapted to strike both strips simultaneously the printing element striking the visible color strip having a human readable character, and the printing element striking the photoluminescent code component having a machine readable code character corresponding to the human readable character.*

*5. A system according to claim 4 including means for readout comprising means for illuminating the whole of the marking area with ultraviolet light and means to detect the photoluminescent emission and to read the code therein.*

*6. A system according to claim 5 including means for readout comprising means for illuminating the marking area with white light simultaneously with the ultraviolet light.*

References Cited

The following references, cited by the Examiner, are of record in the patented file of this patent or the original patent.

UNITED STATES PATENTS

| | | | |
|---|---|---|---|
| 1,864,088 | 6/1932 | Morton | 178—28 |
| 2,951,121 | 8/1960 | Conrad | 178—30 |
| 3,180,988 | 4/1965 | Burkhardt et al. | 235—61.115 |
| 2,784,392 | 3/1957 | Chaimowicz | 235—61.114 |
| 2,788,879 | 4/1957 | Rand | 197—1 |
| 2,962,339 | 11/1960 | Way Dong Woo | 346—74 |
| 2,958,568 | 11/1960 | Hagelbarger | 346—74 |
| 3,105,908 | 10/1963 | Burkhardt | 250—219 D |
| 3,444,517 | 5/1969 | Rabinow | 340—146.3 T |
| 3,279,826 | 10/1966 | Rudershausen | 235—61.12 N |
| 3,377,292 | 4/1968 | Halverson | 252—301.3 |
| 3,367,910 | 2/1968 | Newing | 252—301.2 X |
| 855,559 | 6/1907 | Chapin | 197—172 |
| 3,143,200 | 8/1964 | Gutman | 197—172 |
| 3,145,291 | 8/1964 | Brainerd | 235—61.11 E |

MAYNARD R. WILBUR, Primary Examiner

R. M. KILGORE, Assistant Examiner

U.S. Cl. X.R.

197—172; 250—71, 219 D; 340—149 A